United States Patent

[11] 3,634,032

[72] Inventor Herbert Daymond Segrove
Purley, England
[21] Appl. No. 856,437
[22] Filed Sept. 9, 1969
[45] Patented Jan. 11, 1972
[73] Assignee British Industrial Sand Limited
Surrey, England
[32] Priority Sept. 17, 1968
[33] Great Britain
[31] 44,197/68

[54] PURIFICATION OF SAND
10 Claims, 1 Drawing Fig.
[52] U.S. Cl. .................................................. 23/182 P,
23/87 R, 23/154, 23/200
[51] Int. Cl. ........................................................ C01b 33/12
[50] Field of Search............................................ 23/182, 182
P, 154, 1, 87, 200

[56] References Cited
UNITED STATES PATENTS
2,031,969 2/1936 McGregor et al............. 23/182
2,155,119 4/1939 Ebner........................... 23/1
2,592,580 4/1952 Loevenstein.................. 23/87 X
2,752,223 6/1956 Reeve........................... 23/87
2,952,516 9/1960 Gross............................ 23/182
3,236,596 2/1966 Zirngibl et al. ............... 23/202
3,399,964 9/1968 Michels et al................. 23/87 X
3,442,608 5/1969 Addinall et al. .............. 23/154

OTHER REFERENCES
Chemical Abstracts, 27, (1933) pg. 4047

Primary Examiner—Edward Stern
Attorney—Dowell & Dowell

ABSTRACT: This invention relates to the purification of sand containing iron or iron compound impurities. The sand to be purified is contacted with concentrated hydrochloric acid which dissolves the impurities and the purified sand is freed from the unreacted acid and reaction products. This unreacted acid and the reaction products are then heated, giving hydrogen chloride gas and a decomposition product which is sent to waste. The hydrogen chloride gas is converted to concentrated hydrochloric acid which is then used to purify fresh sand.

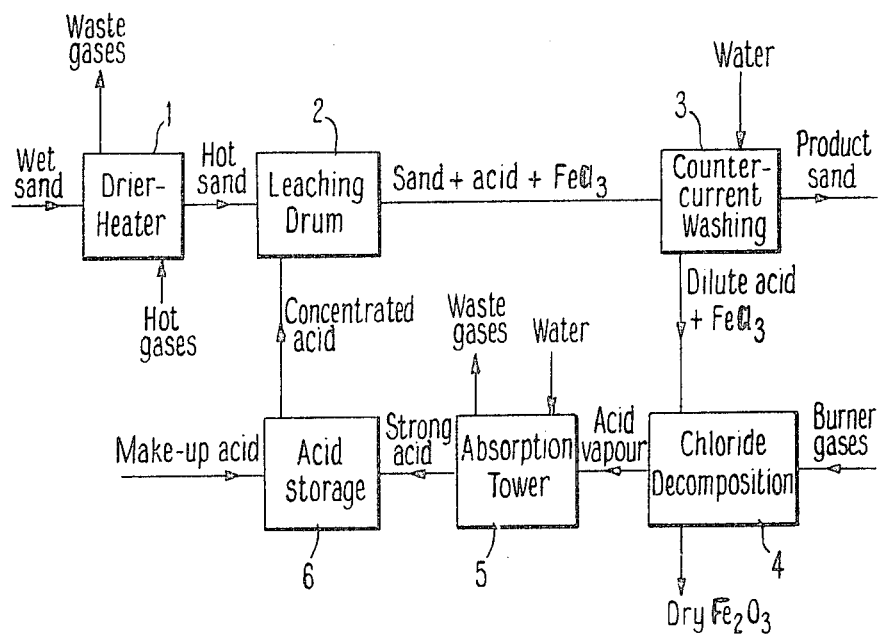

PURIFICATION OF SAND

This invention relates to the purification of sand and is especially concerned with the removal of iron and iron compound contaminants from sand so as to give a purified sand which can be used in the production of colorless glass.

The sand in most sand deposits contains varying amounts of iron or iron compounds and almost invariably a substantial portion of the iron or iron compounds must be removed from the sand before it is suitable for use in colorless glass manufacture because, even small amounts of iron, impart a green color to glass. The problem is particularly acute in the production of colorless glass bottles where any slight green tint tends to be magnified by thick glass cross sections.

The demand for sand is such that the purer sand deposits are becoming worked out and so one must use sands containing larger amounts of iron and try to remove this.

The iron may be present in the sand in various forms. A certain amount may be present in a clay formation and this can be fairly readily removed by a simple water washing. Other iron may be present as heavy minerals which can be removed by gravity separation or by froth flotation. Other iron may be present as a surface stain on the quartz sand grains and the removal of these stains is normally not a simple matter.

In many sands the major part of the iron impurity is in the form of these stains and so once the simple water washing and froth flotation purifications have been effected there is still far too much iron present for the sand to be used in the production of colorless glass.

Various methods of removing these surface stains have been proposed. One method is attrition cleaning in which the surfaces of the grains are abraded against one another while the sand is in the form of a slurry. Another method is to treat the sand with a dilute acid. Although some removal of the stains can be achieved in these ways with certain sands no really successful method has been found.

It is, therefore, an object of the invention to provide a method of purifying sand by the removal of these surface stains.

According to the invention there is provided a process for the purification of sand containing iron and iron compound impurities in which the sand to be purified is contacted with concentrated hydrochloric acid so as to dissolve iron and iron compound impurities, after dissolution of the iron or iron compound impurities, the sand freed from unreacted acid and the acid and sand impurity reaction products which consist predominately of iron chlorides, the unreacted acid and the reaction products are heated to give hydrogen chloride gas and a decomposition product which is predominately iron oxides, and the resulting hydrogen chloride gas is converted to concentrated hydrochloric acid which is recycled for use in purifying further sand.

The purification according to the invention is highly effective in removing the surface stains from the grains of sand and in reducing the iron content of the sand to a figure well below the maximum which can be tolerated in the manufacture of colorless glass. For example, sands which initially contain 0.13 to 0.40 percent of $Fe_2O_3$ after being washed with water, can be treated according to the invention to give a product containing 0.025 to 0.030 percent of $Fe_2O_3$. Such a product can readily be used in the production of colorless glass. At the same time the purification according to the invention is an economic proposition.

The hydrochloric acid is continuously recirculated and there need be only very little wastage of it. Therefore, although it is an expensive material, only very small amounts of it are required once the cycle is in operation to make up losses in the cycle. Also there is no waste acid for disposal which can often be a difficult and expensive problem. The only waste product is ferric oxide whose disposal is a simple matter.

The sand is purified by treatment with concentrated hydrochloric acid which means that the considerable agitation which would be required with dilute acid is not necessary and accordingly the apparatus in which the sand and acid are mixed can be of relatively simple and cheap construction. Desirably the acid has a concentration of 15 to 25 percent weight for weight. The preferred concentration is, however, about 20 percent weight for weight which is approximately the composition of the constant boiling mixture of water and hydrogen chloride at atmospheric pressure.

Before the sand is treated with the acid it has preferably been heated and if necessary dried. The preferred temperature of the sand before treatment is 110° to 120° C., but in cases where the surface stains on the sand are found to be fairly readily soluble, the temperature of the sand can conveniently be as low as 90° C. The treatment with the acid reduces the temperature of the sand and after the treatment the mixture is usually discharged at about 85° to 90° C., although the temperature may be as low as 70° C. particularly when the sand is heated to less high temperatures.

The invention will now be illustrated with reference to the accompanying diagrammatic drawing which is a flow sheet of a sand purification process according to the invention.

The raw sand is normally first washed with water to remove any adhering clay and is then subjected to a preliminary conventional purification in which some of the iron-containing minerals are removed. Such a preliminary purification can consist of a froth flotation or a density or magnetic separation.

The wet sand so produced is then purified in accordance with the invention. Firstly it is dried and heated to 110° to 120° C. in a rotary drum 1 by means of hot combustion gases. As an alternative to the use of the rotary drum 1 the sand can be dried in a fluidized bed heater.

The heated sand then passes from the drum 1 to an inclined rotary leaching drum 2 where it is sprayed with concentrated hydrochloric acid.

The drum 2 may be lined with tiles or other refractory materials, or it may be lined with a hardened rubber or a synthetic plastic film which will resist the attack of the hydrochloric acid at the temperature of the mixture. The length and diameter are chosen so that substantially all of the iron compounds staining the surfaces of the sand grains are dissolved. Generally this means that the mixture is retained in the drum for from 30 to 90 minutes, with a preferred retention time of about 60 minutes. The lining material should also be chosen so that the heat losses are kept to a minimum. The temperature of the sand and acid at the discharge end of the drum 2 is from 70° to 85° C. The feed and discharge ends of the drum are sealed against vapor leaks so as to avoid losses of hydrogen chloride vapor.

The hydrochloric acid fed to the drum 2 preferably has a concentration of about 20 percent since if higher concentrations are used there is a greater risk of losing hydrogen chloride vapor and if a lower concentration is used excessive cooling of the hot sand may occur.

The quantity of acid used is normally between 2 and 12 percent by weight of the sand but about 5 percent is the preferred amount. The quantity is not critical, however, since the acid is recovered almost completely. The use of a larger amount of acid does not therefore increase the cost of the process except in so far as more heat is required to attain the reaction temperature in the leaching drum.

In the drum 2 the acid dissolves the iron compounds which form the surface stains and so the mixture discharged from the drum consists of purified sand, unreacted acid and ferric chloride.

This mixture now passes to a washing stage 3 where the mixture is washed in countercurrent with water so as to leave purified wet sand. Preferably the washing stage 3 consists of multistage filtration (four to six stages are convenient) with washing between the filtration stages. This ensures that the minimum quantity of washing water is used and so reduces the amount of washings to be treated for the recovery of hydrogen chloride. The stage 3 can consist of belt filters or table filters or a combination of them.

The purified wet sand from the stage 3 is taken for any further processing required, or stored either before or after having been dried.

The washings from the stage 3 consist of diluted unreacted acid and ferric chloride solution, together possibly with small amounts of other metal chlorides. The washings are then taken to a decomposition stage 4 where they are heated to hydrolyze the iron chlorides back to hydrogen chloride.

The decomposition of the chlorides may be effected, for example, by spraying the washings through hot combustion gases at say 650° C., or by dropping them on to a heated rotating refractory hearth. These types of equipment may be similar to those used for the recovery of hydrochloric acid from the spent solution used in the "pickling" of steel sheet.

The gases containing the hydrogen chloride vapor pass from the decomposition stage 4 to an absorption tower 5 where they pass in countercurrent flow to a stream of water. The hydrogen chloride dissolves in the water and the rate of flow of water to the tower 5 is chosen so that acid of the strength desired for use in the drum 2 is provided at the base of the tower. This acid is collected and passed to a storage tank 6 into which fresh made-up acid is also added either continuously or intermittently and acid is taken from the tank 6 and recycled to the drum 2 as required.

The ferric oxides, mainly $Fe_2O_3$, and any other metal oxides which are produced in the decomposition stage 4 are taken from that stage in the form of a dry powder. This material is easy to dispose of as waste since it is completely innocuous.

The purification according to the invention is highly effective and because the acid is not wasted, is an economic proposition. Also, the resulting waste products can readily be disposed of by dumping.

The purification according to the invention can be made after preliminary washing and other separation stages as noted above. Alternatively, the purification of the invention can be effected after a water washing and size classification and, thereafter, any dense iron materials not removed by the acid treatment according to the invention can be removed by, for example, density separation, froth flotation or magnetic separation.

The invention will now be illustrated by the following example of a process according to the invention in which all proportions are by weight unless otherwise indicated.

A sand containing 0.21 percent $Fe_2O_3$ after washing with water was introduced into the rotary drum 1 where it was dried and heated to 120° C. At this temperature it was transferred to the leaching drum 2 where it was mixed with hydrochloric acid of 20 percent w/w concentration. The acid was added in a proportion of 6 percent by weight of the sand.

The sand and acid mixture remained in the leaching drum for 60 minutes before it was transferred to the washing stage 3. The temperature of the sand and acid mixture at the outlet of the leaching drum 2 was 79° C. In the washing stage 3, the unreacted acid and metal chlorides were washed from the sand and the so-purified sand was found to contain 0.035 percent $Fe_2O_3$. This purified sand was then subjected to a froth flotation process and the resulting final product sand found to contain 0.029 percent $Fe_2O_3$.

The unreacted acid and metal chlorides from the washing stage 3 were treated as described above to recover the acid.

I claim:

1. A process for the purification of sand containing iron and iron compound impurities comprising the steps of:
   a. heating said sand to be purified to a temperature of 110° to 120° C.,
   b. feeding said hot sand into an inclined rotary leaching drum, said drum having an upper inlet end and a lower outlet end, said sand being fed to said upper inlet end,
   c. adding concentrated hydrochloric acid to said hot sand, said acid having a concentration of from 15 to 25 percent weight for weight and said acid being mixed with said sand in a proportion of from 2 to 12 percent by weight of said sand,
   d. rotating said drum so that said acid and sand become mixed and said acid dissolves said iron and iron compound impurities, and said acid and sand travel from said upper inlet end of said drum to said lower outlet end of said drum,
   e. removing the so treated sand from said lower outlet end of said drum and freeing said so treated sand from unreacted acid and acid and impurity reaction products which consist predominantly of iron chlorides by washing with water,
   f. removing said washed sand as purified product,
   g. heating said unreacted acid, reaction products and washing water to give hydrogen chloride gas and a decomposition product which is predominately iron oxides,
   h. absorbing said hydrogen chloride gas in water to give concentrated hydrochloric acid having a concentration of from 15 to 25 percent weight for weight, and
   i. recycling said acid to treat fresh heated sand in said inclined rotary leaching drum.

2. The process of claim 1 in which said sand is heated to a temperature of at least 90° C.

3. The process of claim 1 in which said sand is contacted with said concentrated hydrochloric acid for from 30 to 90 minutes.

4. The process of claim 3 in which said sand is contacted with said concentrated hydrochloric acid for about 60 minutes.

5. The process of claim 1 in which said sand to be purified is contacted with an amount of said concentrated hydrochloric acid of about 5 percent.

6. The process of claim 1 in which said so treated sand is freed from said unreacted acid and impurity reaction products by washing with water.

7. The process of claim 6 in which said washing is effected by alternate filtration and washing steps.

8. The process of claim 1 in which said unreacted acid and impurity reaction product are sprayed through hot combustion gases to give said hydrogen chloride gas and decomposition product.

9. The process of claim 1 in which said unreacted acid and impurity reaction products are sprayed into a heated rotating refractory hearth to give said hydrogen chloride gas and decomposition product.

10. The process of claim 1 in which said hydrogen chloride gas is absorbed in water to convert it to concentrated hydrochloric acid of the desired strength for recycling.

* * * * *